(12) United States Patent
Calvarese

(10) Patent No.: US 9,658,329 B2
(45) Date of Patent: May 23, 2017

(54) MEASUREMENT OF REFLECTED ULTRASOUND SIGNAL FOR ULTRASONIC EMITTER GATING CONTROL

(71) Applicant: Symbol Technologies, Inc., Schaumburg, IL (US)

(72) Inventor: Russell E. Calvarese, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 905 days.

(21) Appl. No.: 13/851,620

(22) Filed: Mar. 27, 2013

(65) Prior Publication Data
US 2014/0293747 A1 Oct. 2, 2014

(51) Int. Cl.
| | |
|---|---|
| G01S 15/02 | (2006.01) |
| G01S 7/52 | (2006.01) |
| G01S 7/524 | (2006.01) |
| G01S 15/10 | (2006.01) |
| G01S 15/52 | (2006.01) |
| G01S 15/14 | (2006.01) |
| G01S 15/04 | (2006.01) |
| G01S 15/58 | (2006.01) |

(52) U.S. Cl.
CPC ............ *G01S 15/02* (2013.01); *G01S 7/524* (2013.01); *G01S 7/52004* (2013.01); *G01S 15/10* (2013.01); *G01S 15/523* (2013.01); *G01S 15/04* (2013.01); *G01S 15/14* (2013.01); *G01S 15/582* (2013.01)

(58) Field of Classification Search
CPC ...... G01S 15/025; G01S 15/14; G01S 15/931; G01S 15/02; G01S 15/04; G01S 15/523; G01S 7/52004

USPC ...................................................... 367/95–97
See application file for complete search history.

(56) References Cited

U.S. PATENT DOCUMENTS

| | | | |
|---|---|---|---|
| 5,198,989 A | | 3/1993 | Petroff |
| 5,473,686 A | * | 12/1995 | Virdee .................. H04M 9/082 379/402 |

(Continued)

FOREIGN PATENT DOCUMENTS

| | | |
|---|---|---|
| EP | 1652728 | 5/2006 |
| FR | 2648238 | 12/1990 |

(Continued)

OTHER PUBLICATIONS

International Search Report and Written Opinion mailed May 27, 2014 in counterpart PCT application No. PCT/US2014/019002.

*Primary Examiner* — Ian J Lobo

(57) ABSTRACT

A method and apparatus to gate an ultrasonic emitter operation includes a housing including the ultrasonic emitter, where the ultrasonic emitter is operable to periodically transmit an ultrasonic pulse of a predefined frequency. A microphone circuit is disposed in the housing, such that the microphone circuit is operable to receive a reflected ultrasonic signal derived from the transmitted ultrasonic pulse. A controller is coupled to the emitter and the microphone circuit, where the controller operable to gate the operation of the emitter to an OFF state based on at least one measured parameter of the reflected ultrasonic signal. The parameters can include a Doppler measurement and a distance measurement.

11 Claims, 2 Drawing Sheets

(56) References Cited

U.S. PATENT DOCUMENTS

| | | | |
|---|---|---|---|
| 5,657,384 A * | 8/1997 | Staudacher | H04M 9/082 |
| | | | 379/388.01 |
| 6,091,826 A | 7/2000 | Laitinen et al. | |
| 6,925,296 B2 * | 8/2005 | Mattisson | 455/355 |
| 7,054,450 B2 | 5/2006 | McIntosh et al. | |
| 7,724,175 B2 * | 5/2010 | Mahler et al. | 342/22 |
| 2007/0293188 A1 | 12/2007 | Houghton et al. | |
| 2009/0315708 A1 | 12/2009 | Walley et al. | |
| 2011/0140610 A1 | 6/2011 | Van Endert | |

FOREIGN PATENT DOCUMENTS

| | | | | |
|---|---|---|---|---|
| WO | 0192070 A1 | 12/2001 | | |
| WO | 2006099601 A2 | 9/2006 | | |
| WO | WO 2012/063104 A1 * | 5/2012 | | G01S 15/04 |

* cited by examiner

MEASUREMENT OF REFLECTED ULTRASOUND SIGNAL FOR ULTRASONIC EMITTER GATING CONTROL

FIELD OF THE DISCLOSURE

The present disclosure relates generally to an ultrasonic system, and more particularly to ultrasonic signal measurements used to gate an ultrasonic emitter operation.

BACKGROUND

Audio systems have been developed to detect reflected signals for various purposes. For example, the sound pressure and frequency of a loudspeaker output can be detected by a microphone, and this detected information can be used to adjust the loudspeaker output accordingly. In another example, a proximity sensor can be used to detect a nearby object and adjust loudspeaker output. In yet another example, reflected ultrasonic signals are used to calibrate a sound pressure level to maintain a predetermined level. In yet another example, an object detection system is used to change an alarm in response to detecting a nearby object, such as a person. However, none of these systems are used to gate (i.e. turn ON or OFF) a loudspeaker, and all of these systems depend on a single input parameter to adjust an audio their output.

Accordingly, there is a need for a technique to gate an ultrasonic emitter. It would also be beneficial if the control of this gating function could be better controlled using more than one input parameter.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
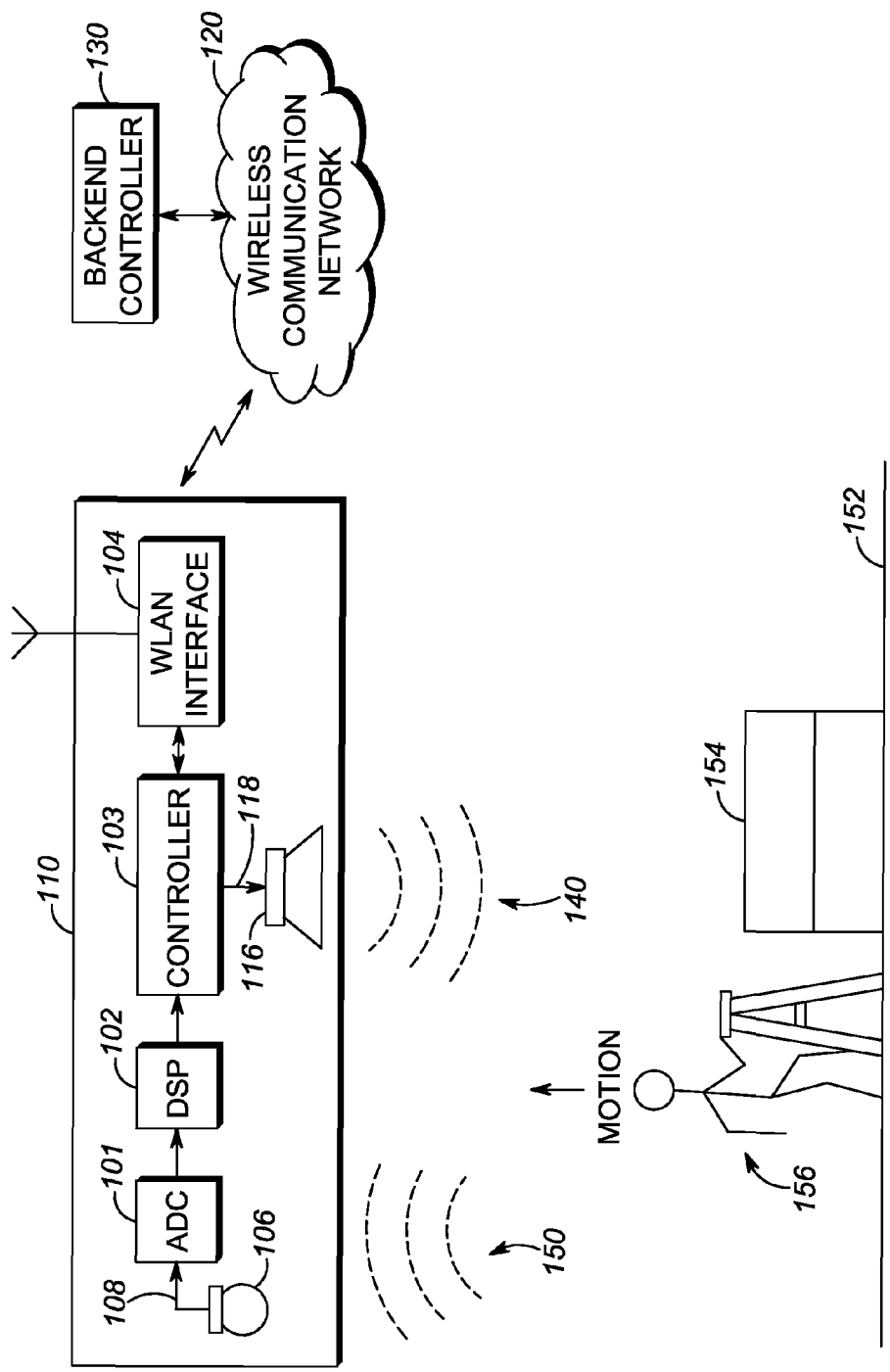
FIG. 1 is a simplified block diagram of an ultrasonic emitter gating system, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a technique is provided to gate an ultrasonic emitter. The control of this gating function can be controlled by using more than one input parameter, such as a Doppler measurement and also a distance measurement, in order to determine whether an object or person is closely approaching the emitter. The present invention has the advantage of using a standard ultrasonic emitter enclosed in a housing with an added microphone circuit, where the housing is pre-disposed within an environment, such as being located on a ceiling of a retail establishment, for example.

Various entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, switches, access points/ports, and wireless clients can all includes separate communication interfaces, transceivers, memories, and the like, all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

FIG. 1 is a block diagram of an ultrasonic system, in accordance with the present invention. At least one ultrasonic transponder such as a piezoelectric speaker or emitter 116 can be disposed within a housing 110 that is affixed within the environment, e.g. attached to the ceiling. Each emitter can be supplied a signal 116 in order to send a short ultrasonic ranging burst or pulse 140 of ultrasound periodically at a preset frequency within the environment, for example within a frequency range of about 35-45 kHz. The housing 110 can include microphone circuitry 106, 108, an analog-to-digital converter 101, and a digital signal processor 102 to process any reflected ultrasonic signals 150. For example, the reflected signal can be received by a transponder such as a microphone 106 that provides an analog signal 108 to an analog-to-digital converter 101 and digital signal processor 102, which is used specifically to analyze the frequency (and amplitude) components of a captured waveform of the reflected signal 150, in accordance with the present invention.

In particular, the circuit of the microphone 106 provides an analog signal 108 to receiver circuitry that can include an amplifier (not shown) and an analog-to-digital converter 101 that converts the reflected ultrasonic signal into a digital waveform which is then sampled by a digital signal processor 102 to analyze the waveform in the frequency domain, i.e. a Fast Fourier Transform (FFT), while the waveform is being captured. It is envisioned that waveform processing and analysis is implemented digitally in the digital signal processor 102. In particular, the digital signal processor processes the digital waveform in the frequency domain into different frequency bins, suppressing the bin encompassing the pulse frequency to eliminate the possibility of interference from the emitter pulse reflections or even a direct signal, and determining the bin having a peak frequency energy of the remaining bins, the peak frequency energy bin defining the Doppler measurement.

The FFT result is an array with each element representing the energy at a frequency range subset. Each element can be referred to as a "bin" to reflect that each element represents all frequencies in a small range lumped into one element. The bin/element for the emitted frequency is suppressed to eliminate direct signals from the emitter or reflections of the pulse from large nearby objects (that are not moving). As used herein, "suppress" means to set the value of that bin/element to zero to set up for next step.

A Doppler frequency shift of the reflected signal from the emitter pulse relates to speed towards or away from the emitter. This is determined by the shift in the raw data buffer between the detected frequency peak of the waveform compared to what the preset pulse frequency should be, i.e. the difference between bin frequencies. In other words, the actual reflected signal frequency is subtracted from the known transmitted ranging pulse frequency to obtain the Doppler shift. The speeds towards or away from the emitters yields the object's vector velocity relative to the emitter. Speeds as low as ¼ miles-per-hour can be detected using this technique.

The FFT also provides the energy in each bin which allows the processor to discern a received signal strength indication (RSSI) of the reflected signal received from the emitter which can also be used to determine distance. In other words, the peak energy of the Doppler shifted bin provides an indicator of distance. Alternatively, a flight time of the emitter pulse and reflected signal can also provide an indicator of distance. For example, a distance can be determined by measuring one-half of the difference between a start time when the emitter transmits the ultrasonic pulse and a stop time when the microphone circuit receives the reflected ultrasonic signal, and dividing this time difference by the speed of sound. This can also be used to establish an emitter mounting height in the environment.

It is envisioned that the emitters are affixed to a ceiling of the indoor environment, with the emitters oriented to emit a perpendicular, downward burst 140 towards a floor of the environment. The burst or pulse can be reflected (i.e. provide an echo) in the form of a reflected ultrasonic signal that can reflect from the floor 152 of the environment or any other stationary object with a perpendicular surface such as a table or shelf 154 that is fixed below the emitter. Such a distance measurement can provide a reference distance, i.e. when there are no objects moving around below the emitter.

Different emitters in other housings (not shown) that are spatially dispersed within the environment can emit the same or different ultrasonic frequencies. For example, different frequencies could be used by nearby emitters such that the microphone circuit will not be confused by pulses transmitted by the nearby emitters, but only recognize its own emitter. In the present invention, ultrasonic tones are typically provided from an emitter broadcasting at about 40 kHz with a pulse duration of about 200 milliseconds.

It should be recognized that other components, including amplifiers, digital filters, and the like, are known in the art and are not shown for the sake of simplicity of the drawings. For example, the microphone signals can be amplified in an audio amplifier and filtered using digital or analog filtering.

The digital signal processor 102 can also be coupled to a controller 103 and wireless local area network interface 104 for wireless communication with other devices in the communication network 120 such as a backend controller 130. The controller 103 or backend controller 130 can be used to provide a signal processing engine utilizing the amplitude and frequency shift characteristics of each received signal from the digital signal processor, as will be detailed below.

The wireless communication network 120 can include local and wide-area wireless networks, wired networks, or other IEEE 802.11 wireless communication systems, including virtual and extended virtual networks. However, it should be recognized that the present invention can also be applied to other wireless communication systems. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

In operation, the present invention is an ultrasonic emitter apparatus configured to gate the emitter operation, i.e. turn the emitter ON or OFF. The ultrasonic emitter 118 is operable to periodically transmit an ultrasonic pulse 140 of a predefined frequency at a maximum sound pressure level in order for the pulse to penetrate attenuators, such as clothing or shelving, in order to reach a receiver (not represented). The microphone circuit 106 is operable to receive a reflected ultrasonic signal 150 derived from the transmitted ultrasonic pulse. The controller 103 is operable to gate the operation of the emitter to an OFF state based on at least one measured parameter of the reflected ultrasonic signal 150.

One of the possible measured parameters is a Doppler measurement of the reflected ultrasonic signal, wherein the controller is operable to gate the operation of the emitter to the OFF state based on the Doppler measurement exceeding a threshold. For example, if a Doppler measurement indicates that a motion of a person climbing a ladder 156 is approaching the emitter 116, then the controller can gate the emitter OFF. Of course people normally would be walking along the floor which could produce some small indication of approaching the emitter, which would be much less than someone climbing a ladder towards the emitter. Therefore, a minimal threshold is used to eliminate the measured Doppler shift of those occurrences of a person just walking on the floor towards the emitter.

Another possible measured parameter is a distance measurement of the reflected ultrasonic signal, wherein the controller is operable to gate the operation of the emitter to the OFF state based on the Doppler measurement exceeding the threshold and the distance measurement being less than a reference distance via a ranging pulse to determine distance using speed of sound. In practice, the housing is positioned on a ceiling of an environment with the emitter pointed downwardly, and the reference distance is a distance downward and perpendicular from the housing to a stationary object (e.g. floor or shelving) in the environment below the housing. As detailed above, the reference distance could be a distance previously measured between the emitter 116 and the floor 152 or some shelving 154. The reference distance can be adjusted to account for people walking on the floor, e.g. subtracting about six feet from the distance to the floor. In this way, people walking on the floor will not trigger any gating, but someone climbing a ladder 156 or standing on a shelf 154 will trigger the gating.

Obtaining the actual distance measurement can be accomplished in different ways. For example, a distance can be inferred from a received signal strength indication (RSSI) of the reflected signal received from the emitter derived from the peak energy of the bin encompassing the Doppler shifted reflected signal, as described above. Alternatively, a flight time of the emitter pulse and reflected signal can also provide an indicator of distance, also as describe above.

Once the emitter has been gated off, the present invention also provides a technique to turn it back ON again. In particular, after the emitter is gated OFF, the controller is operable to direct the emitter to periodically transmit the ultrasonic pulse at an amplitude set to be just over the ambient noise in the environment (which can be averaged by the microphone), and wherein the controller is operable to gate the operation of the emitter to an ON state at full output (sound pressure level) based on one of the Doppler measurement being less than a second threshold and the distance measurement being at least the reference distance, indicating that the person has left the vicinity allowing the emitter to run at full power again. In this case a second threshold is used to ensure that the person has left or is leaving the vicinity of the emitter, and can be any value of zero (i.e. person has left) or less (i.e. person is moving away from the emitter).

Other considerations are addressed for an environment containing multiple emitter devices. For example, the controller can change the timing and frequency of the ultrasonic pulse to be emitted, so as to prevent collisions with pulses emitted by other nearby emitters.

In one embodiment, different ultrasonic frequencies can be used by different emitters at different particular locations. In this case, each pulse can be broadcast simultaneously with other pulses from other emitters, which will provide a higher information refresh rate. When the digital signal processor performs a FFT on these simultaneous signals, several frequency peaks can be found, and those that are different than the pulse transmitted by its own emitter can be suppressed. In order to avoid processing complexity, it would be desirable to select these frequencies such that they can be easily discerned by the DSP. In addition, these signal frequencies must be separated by a sufficient amount to provident overlapping of frequencies due to Doppler shifts. Due to Doppler shifts that can occur, the amount of discernable frequency tones that can be accurately recognized within the available ultrasonic frequency range is limited. In the ultrasonic band of interest (35 kHz to 45 kHz), it is possible to distinguish a total of up to thirty distinct tones while still leaving room for as much as +/−125 Hz of Doppler shift (more than enough margin to accommodate that which would be present from a very fast approach speed).

In another embodiment, the same ultrasonic frequency pulse can be used by all emitters. In this case, each emitter could broadcast its tone separated in time from other emitters. Although this provides a lower information refresh rate than the first embodiment, it is much simpler and more accurate to implement. When the digital signal processor performs a FFT on this signal, one frequency peak will be found in each specified time period.

To determine the actual frequency peak, the controller can send the peak frequencies it detects over the communication network to a backend controller that can determine the Doppler shifts and distance measurements.

It should be recognized that the particular pulses of the ultrasonic emitters could be changed during operation. Choosing which pulses to use can be coordinated by the backend controller of the locationing system, which can communicate over the communication network to direct each emitter to emit the same specific tone periodically at the same or different particular time periods.

Figure 2:
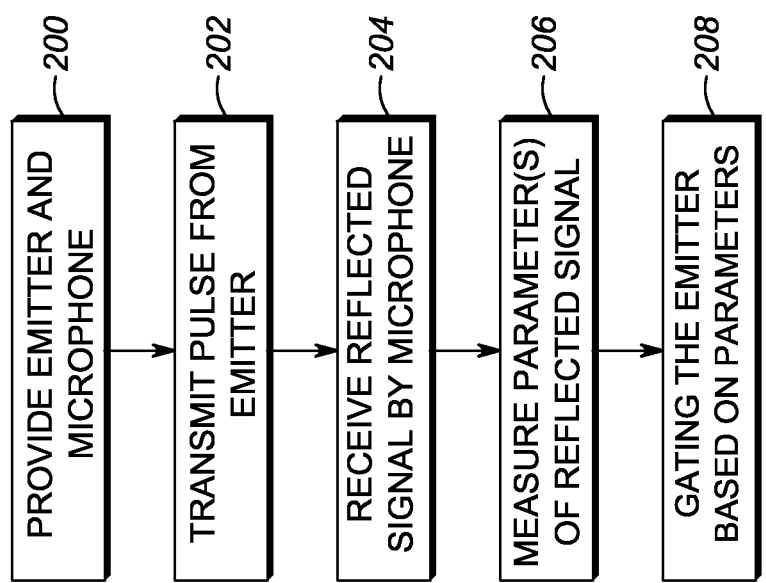
FIG. 2 is a flow diagram illustrating a method for gating an ultrasonic emitter, in accordance with the present invention.

FIG. 2 is a diagram illustrating a method for gating an ultrasonic emitter operation.

A first step 200 includes providing an ultrasonic emitter and microphone circuit disposed in a housing within an environment.

A next step 202 includes transmitting an ultrasonic pulse of a predefined frequency from the ultrasonic emitter.

A next step 204 includes receiving a reflected ultrasonic signal derived from the transmitted ultrasonic pulse by the microphone circuit.

A next step 206 includes measuring at least one parameter of the reflected ultrasonic signal. The parameters in the measuring step can include obtaining a Doppler measurement and a distance measurement of the reflected ultrasonic signal. In particular, this step includes converting the ultrasonic pulse into a digital waveform in the frequency domain using a Fast Fourier Transform, and processing the digital waveform in the frequency domain into different frequency bins, suppressing the bin including the pulse frequency, and determining the bin having a peak frequency energy of the remaining bins, the peak frequency energy bin defining the Doppler measurement and the distance A next step 208 includes gating the ultrasonic emitter to an OFF state based on the at least one measured parameter of the reflected ultrasonic signal. For example this step can include gating the operation of the emitter to the OFF state based on the Doppler measurement exceeding a threshold and the distance measurement being less than a reference distance, i.e. a person is closely approaching. After being gated OFF, this step can also include direct the emitter to periodically transmit the ultrasonic pulse at an amplitude set to be just over the ambient noise in the environment, and gate the operation of the emitter to an ON state at full output based on one of the Doppler measurement being less than a second threshold and the distance measurement being at least the reference distance, i.e. the person is going or has gone away.

Advantageously, the present invention provides a technique using an ultrasonic emitter, microphone circuit, and a digital signal processor, to determine the close approach of a person to the emitter, thereby triggering the emitter to turn off. This allows the use of a high sound pressure level for direct path sound to penetrate through attenuators (e.g. shelving or clothes) to a particular receiver in the environment, which is critical to location accuracy when a receiver is not in a line-of-site to the emitter, and provides that the high sound pressure level can be turned off upon a close approach of a person to the emitter. The present invention can be implemented using this existing hardware and a software application which could be downloaded and installed to use the existing hardware in the novel way described herein. The processing power to measure the reflected ultrasonic signal is minimal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors or processing devices such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc Read Only Memory, an optical storage device, a magnetic storage device, a Read Only Memory, a Programmable Read Only Memory, an Erasable Programmable Read Only Memory, an Electrically Erasable Programmable Read Only Memory, and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An ultrasonic emitter apparatus configured to gate the emitter operation, the apparatus comprising:
    a housing including the ultrasonic emitter, the ultrasonic emitter being operable to periodically transmit an ultrasonic pulse of a predefined frequency;
    a microphone circuit disposed in the housing, the microphone circuit operable to receive a reflected ultrasonic signal derived from the transmitted ultrasonic pulse;
    a controller coupled to the emitter and the microphone circuit, the controller operable to gate the operation of the emitter to an OFF state based on at least one measured parameter of the reflected ultrasonic signal; and
    wherein one measured parameter is a Doppler measurement of the reflected ultrasonic signal, wherein the controller is operable to gate the operation of the emitter to the OFF state based on the Doppler measurement exceeding a threshold.

2. The apparatus of claim 1, wherein another measured parameter is a distance measurement of the reflected ultrasonic signal, wherein the controller is operable to gate the operation of the emitter to the OFF state based on the Doppler measurement exceeding the threshold and the distance measurement being less than a reference distance.

3. The apparatus of claim 2, wherein the housing is positioned on a ceiling of an environment with the emitter pointed downwardly, and the reference distance is a distance downward and perpendicular from the housing to a stationary object in the environment below the housing.

4. The apparatus of claim 3, wherein the distance measurement is determined by measuring one-half of the difference between a start time when the emitter transmits the ultrasonic pulse and a stop time when the microphone circuit receives the reflected ultrasonic signal.

5. The apparatus of claim 1, wherein one measured parameter is the Doppler measurement of the reflected ultrasonic signal and another measured parameter is a distance measurement of the reflected ultrasonic signal, wherein after the emitter is gated OFF, the controller is operable to turn the emitter back ON again to direct the emitter to periodically transmit the ultrasonic pulse at an amplitude set to be just over the ambient noise in the environment, and wherein the controller is operable to gate the operation of the emitter to an ON state at full output based on one of the Doppler measurement being less than a second threshold and the distance measurement being at least the reference distance.

6. The apparatus of claim 1, further comprising:
an analog-to-digital converter coupled to microphone circuit and operable to convert the reflected ultrasonic signal into a digital waveform; and
a digital signal processor coupled to the analog-to-digital converter and operable to: process the digital waveform in the frequency domain into different frequency bins, suppress the bin including the pulse frequency, and determine the bin having a peak frequency energy of the remaining bins, the peak frequency energy bin defining the Doppler measurement.

7. The apparatus of claim 6, wherein another measured parameter is a distance measurement of the reflected ultrasonic signal, and wherein the distance measurement is determined by the magnitude of the peak frequency energy, and wherein the controller is operable to gate the operation of the emitter to the OFF state based on the Doppler measurement exceeding the threshold and the distance measurement being less than a reference distance.

8. The apparatus of claim 6, wherein the digital signal processor is operable to perform a Fast Fourier Transform on the digital waveform.

9. An ultrasonic emitter apparatus configured to use reflected signal measurements to gate the emitter operation, the apparatus comprising:
a housing including the ultrasonic emitter, the ultrasonic emitter being operable to periodically transmit an ultrasonic pulse of a predefined frequency;
a microphone circuit disposed in the housing, the microphone circuit operable to receive a reflected ultrasonic signal derived from the transmitted ultrasonic pulse; and
a controller coupled to the emitter and the microphone circuit, the controller operable to gate the operation of the emitter to an OFF state based on a Doppler measurement of the reflected ultrasonic signal exceeding a threshold and distance measurement of the reflected ultrasonic signal being less than a reference distance, and whereafter the controller is operable to direct the emitter to periodically transmit the ultrasonic pulse at an amplitude set to be just over the ambient noise in the environment, and gate the operation of the emitter to an ON state at full output based on one of the Doppler measurement being less than a second threshold and the distance measurement being at least the reference distance.

10. A method for gating an ultrasonic emitter operation, the method comprising the steps of:
providing an ultrasonic emitter and microphone circuit disposed in a housing within an environment;
transmitting an ultrasonic pulse of a predefined frequency from the ultrasonic emitter periodically;
receiving a reflected ultrasonic signal derived from the transmitted ultrasonic pulse by the microphone circuit;
measuring at least one parameter of the reflected ultrasonic signal;
gating the ultrasonic emitter to an OFF state based on the at least one measured parameter of the reflected ultrasonic signal; and
wherein the parameters in the measuring step includes a Doppler measurement and a distance measurement of the reflected ultrasonic signal, and the gating step includes gating the operation of the emitter to the OFF state based on the Doppler measurement exceeding a threshold and the distance measurement being less than a reference distance.

11. The method of claim 10, wherein the measuring step includes the substeps of:
converting the ultrasonic pulse into a digital waveform; and
processing the digital waveform in the frequency domain into different frequency bins, suppressing the bin including the pulse frequency, and determining the bin having a peak frequency energy of the remaining bins, the peak frequency energy bin defining the Doppler measurement.

* * * * *